(12) United States Patent
Inoue

(10) Patent No.: US 8,534,048 B2
(45) Date of Patent: Sep. 17, 2013

(54) EXHAUST PURIFICATION SYSTEM OF INTERNAL COMBUSTION ENGINE

(75) Inventor: Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/260,641

(22) PCT Filed: Nov. 27, 2009

(86) PCT No.: PCT/JP2009/070361
§ 371 (c)(1),
(2), (4) Date: Sep. 27, 2011

(87) PCT Pub. No.: WO2011/064902
PCT Pub. Date: Jun. 3, 2011

(65) Prior Publication Data
US 2012/0240558 A1    Sep. 27, 2012

(51) Int. Cl.
*F01N 3/00* (2006.01)

(52) U.S. Cl.
USPC .................. 60/281; 60/286; 60/288; 60/292; 60/295; 60/324

(58) Field of Classification Search
USPC .................. 60/281, 285, 286, 287, 288, 292, 60/295, 297, 303, 324
See application file for complete search history.

(56) References Cited

U.S. PATENT DOCUMENTS 6,409,973 B1 * 6/2002 Kinugasa et al. ............. 422/171
6,588,203 B2 * 7/2003 Hirota et al. .................... 60/297
7,219,491 B2 * 5/2007 Nakatani ......................... 60/286
7,908,844 B2 * 3/2011 Kamoshita et al. ............. 60/286
8,006,484 B2 * 8/2011 Dalla Betta ..................... 60/288
8,042,328 B2 * 10/2011 Ono ................................ 60/301

FOREIGN PATENT DOCUMENTS

| JP | A-2000-110552 | 4/2000 |
| JP | A-2004-92431 | 3/2004 |
| JP | A-2004-108322 | 4/2004 |
| JP | A-2004-340045 | 12/2004 |
| JP | A-2007-162499 | 6/2007 |
| JP | A-2008-38704 | 2/2008 |
| JP | A-2008-180205 | 8/2008 |

OTHER PUBLICATIONS

International Search Report dated Feb. 2, 2010 in International Application No. PCT/JP2009/070361.

* cited by examiner

Primary Examiner — Binh Q Tran
(74) Attorney, Agent, or Firm — Oliff & Berridge, PLC

(57) ABSTRACT

An exhaust purification system of an internal combustion engine provided with an $NO_x$ storage reduction catalyst an oxidation catalyst which is arranged downstream of the $NO_x$ storage reduction catalyst an exhaust gas tank which is connected to the engine exhaust passage between the $NO_x$ storage reduction catalyst and the oxidation catalyst, and a switching valve which closes the engine exhaust passage toward the oxidation catalyst and makes the exhaust gas flow into the tank. When making the air-fuel ratio of the exhaust gas which flows into the $NO_x$ storage reduction catalyst rich, the engine exhaust passage toward the oxidation catalyst is shut and the flow path is switched so that the exhaust gas flows to the tank to thereby store the exhaust gas in the tank.

8 Claims, 11 Drawing Sheets

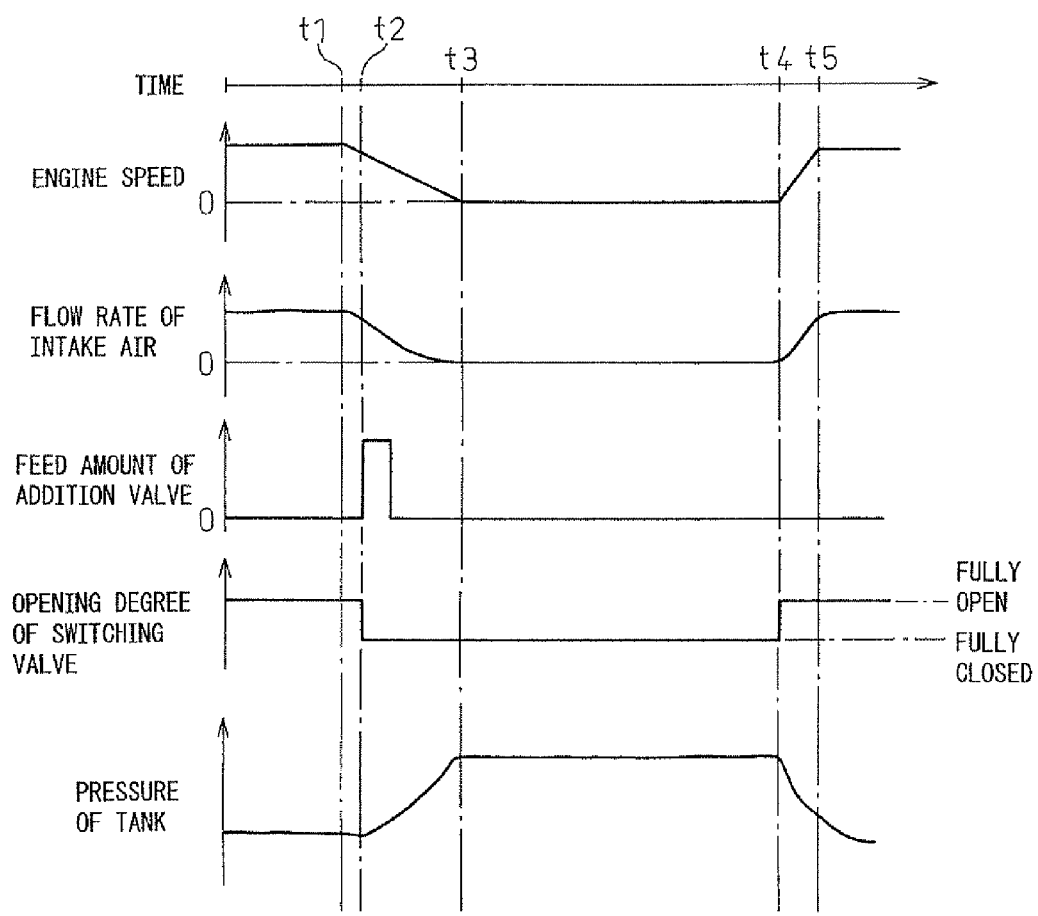

EXHAUST PURIFICATION SYSTEM OF INTERNAL COMBUSTION ENGINE

TECHNICAL FIELD

The present invention relates to an exhaust purification system of an internal combustion engine.

BACKGROUND ART

The exhaust gas of a diesel engine or other internal combustion engine, for example, contains carbon monoxide (CO), unburned hydrocarbons (HC), particulate matter (PM), and also nitrogen oxides ($NO_x$). As one method for removing the nitrogen oxides, it is known to arrange an exhaust purification system for reducing the $NO_x$ in an engine exhaust passage.

The system for reducing the $NO_x$ includes an $NO_x$ storage reduction catalyst which temporarily stores the $NO_x$. The $NO_x$ storage reduction catalyst stores NO when the air-fuel ratio of the exhaust gas is large, that is, when the air-fuel ratio of the exhaust gas is lean. As opposed to this, when the air-fuel ratio of the exhaust gas is small, that is, when the air-fuel ratio of the exhaust gas is the stoichiometric air-fuel ratio or rich, it releases the stored $NO_x$ and uses a reducing agent which is contained in the exhaust gas to reduce and remove the $NO_x$.

The $NO_x$ storage reduction catalyst gradually accumulates $NO_x$ if use is continued. Further, when the exhaust gas which flows into the $NO_x$ storage reduction catalyst contains $SO_x$, the $SO_x$ is stored. If the $NO_x$ storage reduction catalyst accumulates a lot of $NO_x$ or $SO_x$, its ability to remove $NO_x$ from the exhaust gas falls. For this reason, the $NO_x$ storage reduction catalyst is regenerated by making it release the $NO_x$ or $SO_x$. When regenerating it by making it release the $NO_x$, the air-fuel ratio of the exhaust gas which flows into the $NO_x$ storage reduction catalyst is made the stoichiometric air-fuel ratio or rich. When regenerating it by making it release the $SO_x$, the temperature of the $NO_x$ storage reduction catalyst is made the temperature enabling release of $SO_x$ or more, then the air-fuel ratio of the exhaust gas which flows into the $NO_x$ storage reduction catalyst is made the stoichiometric air-fuel ratio or rich.

Japanese Patent Publication (A) No. 2004-92431 discloses an exhaust gas purification system which has an exhaust passage having a first partial exhaust passage and a second partial exhaust passage and having the partial exchange passages converge into a common exhaust passage at the downstream side, $NO_x$ storage agents which are arranged in each partial exhaust passage, and an oxidation catalyst which is arranged in the common exhaust passage. In this exhaust gas purification system, when control for desorption of sulfur is performed at the $NO_x$ storage agent, the air-fuel ratio of the exhaust gas at each partial exhaust passage is controlled so that the air-fuel ratio of the exhaust gas which flows through the oxidation catalyst becomes slightly lean. In this exhaust gas purification system, it is disclosed that the control for desorption of sulfur of the $NO_x$ storing means can be efficiently performed and that $H_2S$ can be kept from being released to the outside.

CITATION LIST

Patent Literature

PLT 1: Japanese Patent Publication (A) No. 2004-92431

SUMMARY OF INVENTION

Technical Problem

When regenerating the $NO_x$ storage reduction catalyst, the air-fuel ratio of the exhaust gas which flows into the $NO_x$ storage reduction catalyst is made the stoichiometric air-fuel ratio or rich. For example, unburned fuel is injected into the engine exhaust passage so as to make the air-fuel ratio of the exhaust gas which flows into the $NO_x$ storage reduction catalyst the stoichiometric air-fuel ratio or rich.

The exhaust gas which flows out from the $NO_x$ storage reduction catalyst contains CO (carbon monoxide), HC (unburned fuel), $H_2S$ (hydrogen sulfide), $NH_3$ (ammonia), and other substances. These substances can be removed by oxidation. To oxidize the $H_2S$ or other substance to be oxidized which flows out from the $NO_x$ storage reduction catalyst, it is possible to arrange an oxidation catalyst downstream of the $NO_x$ storage reduction catalyst in the engine exhaust passage. When the exhaust gas which flows out from the $NO_x$ storage reduction catalyst contains a large amount of oxygen, the oxidation catalyst can be used for effective oxidation.

In this regard, when regenerating an $NO_x$ storage reduction catalyst, the air-fuel ratio of the exhaust gas which flows into the $NO_x$ storage reduction catalyst is made the stoichiometric air-fuel ratio or rich. The amount of oxygen which is contained in the exhaust gas becomes insufficient compared with the amount required for oxidation of the substance to be oxidized. For this reason, there was the problem that the oxidation reaction of the substance to be oxidized at the oxidation catalyst becomes insufficient and the substance passes straight through the oxidation catalyst to be released into the atmosphere.

The system disclosed in the above Japanese Patent Publication (A) No. 2004-92431 formed two engine exhaust passages in parallel and further required that each passage have an $NO_x$ storage catalyst, fuel addition system, and gate valves arranged in it, so the configuration became complicated.

Solution to Problem

The present invention has as its object the provision of an exhaust purification system of an internal combustion engine which keeps a substance to be oxidized which is contained in exhaust gas from being released into the atmosphere.

A first exhaust purification system of an internal combustion engine of the present invention is provided with an $NO_x$ storage reduction catalyst which is arranged in an engine exhaust passage, stores $NO_x$ which is contained in exhaust gas when an air-fuel ratio of inflowing exhaust gas is lean, and releases the stored $NO_x$ when the air-fuel ratio of the inflowing exhaust gas becomes a stoichiometric air-fuel ratio or rich, an oxidation catalyst which is arranged downstream of the $NO_x$ storage reduction catalyst in the engine exhaust passage, an exhaust gas tank which is connected to the engine exhaust passage between the $NO_x$ storage reduction catalyst and the oxidation catalyst, and a flow path changing device which closes the engine exhaust passage from the $NO_x$ storage reduction catalyst toward the oxidation catalyst and makes the exhaust gas flow into the tank. When making the air-fuel ratio of the exhaust gas which flows into the $NO_x$ storage reduction catalyst the stoichiometric air-fuel ratio or rich, the engine exhaust passage toward the oxidation catalyst is closed and the flow path is changed so that the exhaust gas flows into the tank and at least part of the stoichiometric air-fuel ratio or rich air-fuel ratio exhaust gas which flows out from the $NO_x$ storage reduction catalyst is stored in the tank.

In the above invention, it is preferable to switch the air-fuel ratio of the exhaust gas which flows into the $NO_x$ storage reduction catalyst from the stoichiometric air-fuel ratio or rich state to the lean state and to open the engine exhaust passage toward the oxidation catalyst so as to mix exhaust gas which was stored in the tank and exhaust gas which flows out from the $NO_x$ storage reduction catalyst while feeding exhaust gas to the oxidation catalyst.

In the above invention, it is preferable that the tank be formed so as to extend along the engine exhaust passage and that the oxidation catalyst be arranged inside of the tank.

In the above invention, it is preferable that the system be provided with a pressure detection device which detects a pressure inside the tank, the system be formed so as to perform control for repeating a period where the air-fuel ratio of the exhaust gas which flows into the $NO_x$ storage reduction catalyst is the stoichiometric air-fuel ratio or rich and a period where the air-fuel ratio is lean, the system be formed so that when the flow path changing device opens the engine exhaust passage toward the oxidation catalyst, it is possible to adjust the flow rate of the exhaust gas which flows into the oxidation catalyst, the system estimate a pressure drop speed in the tank in the time period when opening the engine exhaust passage toward the oxidation catalyst and use the estimated pressure drop speed and a predetermined time period for maintaining the air-fuel ratio of the exhaust gas lean as the basis so as to adjust the flow rate of the exhaust gas flowing into the oxidation catalyst so that the pressure of the tank falls to the pressure before storing of the exhaust gas before the time of the end of the time period for maintaining the air-fuel ratio of the exhaust gas lean.

In the above invention, it is preferable that the system comprises an exhaust purification system of an internal combustion engine which makes the air-fuel ratio of the exhaust gas which flows into the $NO_x$ storage reduction catalyst the stoichiometric air-fuel ratio or rich when the engine body should be stopped, and which closes the engine exhaust passage toward the oxidation catalyst when stoichiometric air-fuel ratio or rich exhaust gas flows into the $NO_x$ storage reduction catalyst and stops the engine body in the state with the engine exhaust passage closed and opens the flow path toward the oxidation catalyst when restarting the engine body.

A second exhaust purification system of an internal combustion engine of the present invention is provided with an $NO_x$ storage reduction catalyst which is arranged in an engine exhaust passage, stores $NO_x$ which is contained in exhaust gas when an air-fuel ratio of inflowing exhaust gas is lean, and releases the stored $NO_x$ when the air-fuel ratio of the inflowing exhaust gas becomes a stoichiometric air-fuel ratio or rich, an oxidation catalyst which is arranged downstream of the $NO_x$ storage reduction catalyst in the engine exhaust passage, an exhaust gas tank which is connected to the engine exhaust passage between the $NO_x$ storage reduction catalyst and the oxidation catalyst, and a flow path changing device which closes the engine exhaust passage from the $NO_x$ storage reduction catalyst toward the oxidation catalyst and makes the exhaust gas flow into the tank. In the time period when the air-fuel ratio of the exhaust gas which flows into the $NO_x$ storage reduction catalyst is lean, the system closes the engine exhaust passage toward the oxidation catalyst and switches the flow path so that the exhaust gas flows into the tank so as to store at least part of the lean air-fuel ratio exhaust gas which flows out from the $NO_x$ storage reduction catalyst in the tank, and, when making the air-fuel ratio of the exhaust gas which flows into the $NO_x$ storage reduction catalyst the stoichiometric air-fuel ratio or rich, the system opens the engine exhaust passage toward the oxidation catalyst and mixes exhaust gas which was stored in the tank and exhaust gas which flows out from the $NO_x$ storage reduction catalyst while feeding exhaust gas to the oxidation catalyst.

In the above invention, it is preferable that the tank be formed so as to extend along the engine exhaust passage and that the oxidation catalyst be arranged inside of the tank.

In the above invention, it is preferable that when an engine speed falls and thereby a flow rate of exhaust gas which flows into the $NO_x$ storage reduction catalyst is reduced, the flow path changing device be used to store lean air-fuel ratio exhaust gas in the tank, and, after the flow rate of exhaust gas which flows into the $NO_x$ storage reduction catalyst is reduced, then becomes substantially constant, the system make the air-fuel ratio of the exhaust gas which flows into the $NO_x$ storage reduction catalyst the stoichiometric air-fuel ratio or rich and open the engine exhaust passage toward the oxidation catalyst.

Advantageous Effects of Invention

According to the present invention, it is possible to provide an exhaust purification system of an internal combustion engine which can keep a substance to be oxidized in exhaust gas from being released to the atmosphere.

BRIEF DESCRIPTION OF DRAWINGS

FIG. 15 is a time chart of second operational control in a third embodiment.

DESCRIPTION OF EMBODIMENTS

First Embodiment

Referring to FIG. 1 to FIG. 11, an exhaust purification system of an internal combustion engine according to a first embodiment will be explained.

Figure 1:
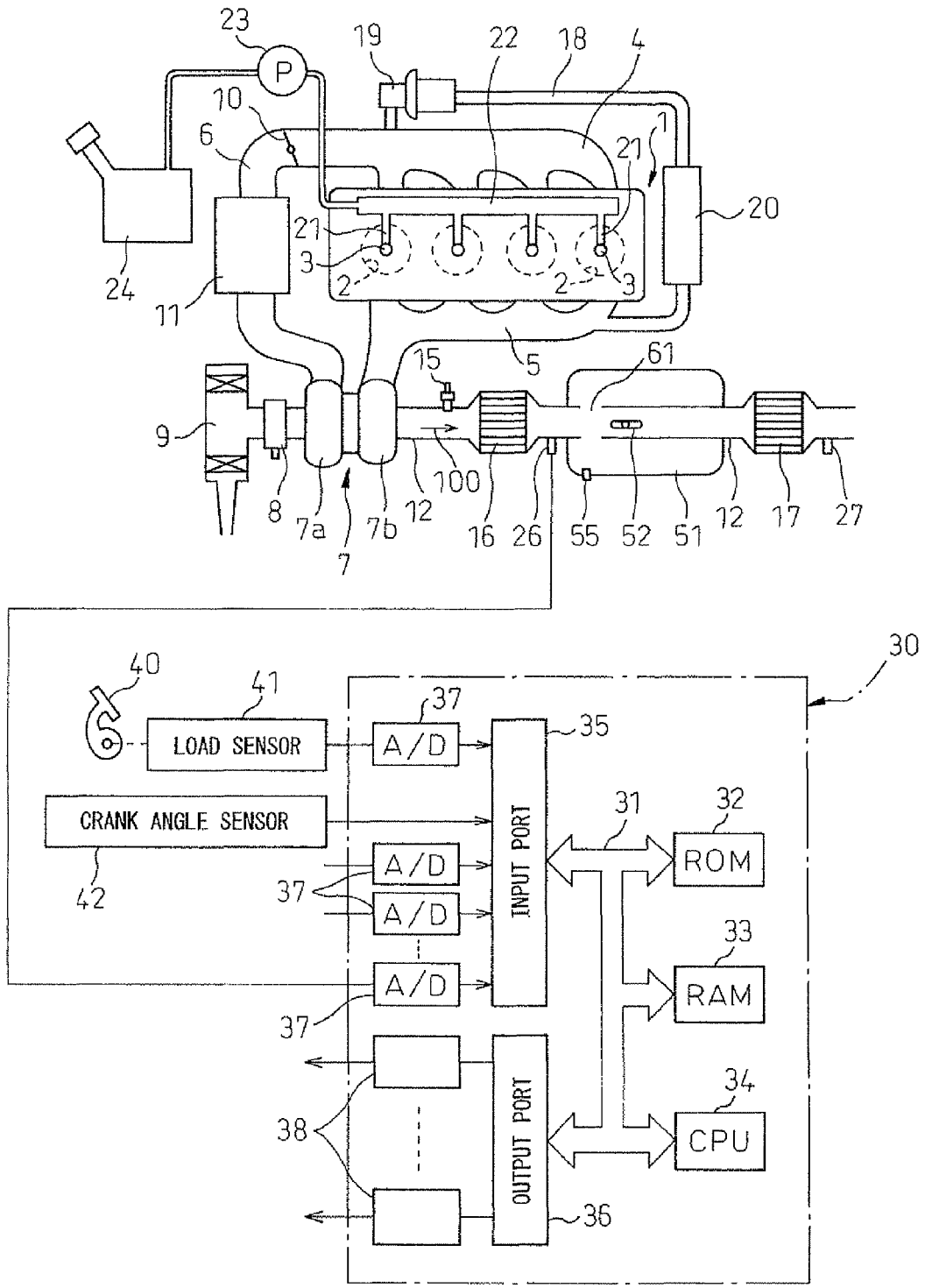
FIG. 1 is a schematic view of an internal combustion engine in a first embodiment.

FIG. 1 shows an overview of an internal combustion engine in the present embodiment. In the present embodiment, a compression ignition type of diesel engine will be used as an example for the explanation. The internal combustion engine is provided with an engine body 1. The engine body 1 includes combustion chambers 2 of the cylinders, electronically controlled fuel injectors 3 for injecting fuel into the combustion chambers 2, an intake manifold 4, and an exhaust manifold 5.

The internal combustion engine in the present embodiment is provided with a supercharger constituted by an exhaust turbocharger 7. The intake manifold 4 is connected through an intake duct 6 to an outlet of a compressor 7a of the exhaust turbocharger 7. The inlet of the compressor 7a is connected through an intake air detector 8 to an air cleaner 9. Inside of the intake duct 6 forming part of the engine intake passage, a throttle valve 10 which is driven by a step motor is arranged. Furthermore, at the intake duct 6, a cooling device 11 is arranged for cooling the intake air which flows through the inside of the intake duct 6. In the embodiment shown in FIG. 1, engine cooling water is guided to the cooling device 11 where the engine cooling water is then used to cool the intake air.

On the other hand, the exhaust manifold 5 is connected to an inlet of the turbine 7b of the exhaust turbocharger 7. The outlet of the exhaust turbine 7b is connected through the exhaust pipe 12 to an $NO_x$ storage reduction catalyst (NSP) 16. Downstream of the $NO_x$ storage reduction catalyst 16 in the engine exhaust passage, an oxidation catalyst 17 is arranged. The oxidation catalyst 17 is connected through the exhaust pipe 12 to the $NO_x$ storage reduction catalyst 16.

Upstream of the $NO_x$ storage reduction catalyst 16 in the exhaust pipe 12, as a fuel feed device for feeding unburned fuel to the inside of the exhaust pipe 12, a fuel addition valve 15 is arranged. The fuel addition valve 15 is formed to have a fuel feed action by which it feeds or stops the feed of fuel. The exhaust purification system in the present embodiment is formed so that the fuel of the engine body 1 is injected from the fuel addition valve 15. The fuel which is injected from the fuel addition valve 15 is not limited to this. The system may also be formed so as to inject fuel different from the fuel of the engine body 1. The exhaust gas, as shown by the arrow 100, flows toward the $NO_x$ storage reduction catalyst 16.

Between the exhaust manifold 5 and the intake manifold 4, an exhaust gas recirculation (EGR) passage 18 is arranged for EGR. Inside the EGR passage 18, an electronically controlled EGR control valve 19 is arranged. Further, inside the EGR passage 18, a cooling device 20 is arranged for cooling the EGR gas which flows through the inside of the EGR passage 18. In the embodiment shown in FIG. 1, the engine cooling water is guided to the cooling device 20 where the engine cooling water is used to cool the EGR gas.

The fuel injectors 3 are connected through fuel feed tubes 21 to a common rail 22. This common rail 22 is connected through an electronically controlled variable discharge fuel pump 23 to a fuel tank 24. The fuel which is stored in the fuel tank 24 is fed by the fuel pump 23 to the inside of the common rail 22. The fuel which is fed to the common rail 22 is fed through the fuel feed tubes 21 to the fuel injectors 3.

The electronic control unit 30 is comprised of a digital computer. The control system of the internal combustion engine in the present embodiment includes the electronic control unit 30. The electronic control unit 30 is provided with components connected to each other through a bidirectional bus 31 such as a ROM (read only memory) 32, RAM (random access memory) 33, CPU (microprocessor) 34, input port 35, and output port 36. The ROM 32 is a storage device exclusively for read use and stores in advance the maps and other information necessary for performing control. The CPU 34 can perform any computation or judgment. The RAM 33 is a writable storage device and can store operation history or other information or temporarily store results of processing.

In the engine exhaust passage downstream of the $NO_x$ storage reduction catalyst 16, a temperature sensor 26 is arranged for detecting the temperature of the $NO_x$ storage reduction catalyst 16. Further, downstream of the oxidation catalyst 17, a temperature sensor 27 is arranged for detecting the temperature of the oxidation catalyst 17. The output signals of the temperature sensors 26 and 27 are input through corresponding AD converters 37 to the input port 35.

The accelerator pedal 40 has connected to it a load sensor 41 which generates an output voltage proportional to the amount of depression L of the accelerator pedal 40. The output voltage of the load sensor 41 is input through the corresponding AD converter 37 to the input port 35. Further, the input port 35 has connected to it a crank angle sensor 42 which generates an output pulse each time a crank shaft for example rotates by 15°. The output of the crank angle sensor 42 can be used to detect the speed of the engine body 1.

On the other hand, the output port 36 is connected through corresponding drive circuits 38 to the fuel injectors 3, a step motor for driving the throttle valve 10, EOR control valve 19, and fuel pump 23. Further, the output port 36 is connected through a corresponding drive circuit 38 to the fuel addition valve 15. These devices are controlled by the electronic control unit 30.

The exhaust purification system of the present embodiment is provided with a switching valve 52 which can close the engine exhaust passage. The switching valve 52 is arranged inside of the engine exhaust passage. The switching valve 52 is arranged between the $NO_x$ storage reduction catalyst 16 and the oxidation catalyst 17. The switching valve 52 in the present embodiment is a butterfly valve. The switching valve 52 is provided with a plate-shaped member which pivots about a shaft. The plate-shaped member has a "greatest area surface" at which the area becomes the greatest. The switching valve 52 becomes fully opened when the greatest area surface of the plate-shaped member becomes substantially parallel to the direction of the flow of the exhaust gas shown in the arrow 100. The switching valve 52 becomes fully closed when the greatest area surface of the plate shaped member becomes substantially vertical to the direction of the flow of the exhaust gas. The switching valve 52 is connected through the corresponding drive circuit 38 to the output port 36 of the electronic control unit 30. The switching valve 52 is controlled by the electronic control unit 30.

The exhaust purification system of the present embodiment is provided with a tank 51 which is connected to the engine exhaust passage between the $NO_x$ storage reduction catalyst 16 and the oxidation catalyst 17. The tank 51 is an exhaust tank which temporarily stores the exhaust gas. The tank 51 in the present embodiment is formed so as to extend along the exhaust pipe 12. The tank 51 is formed so as to cover part of the exhaust pipe 12. The tank 51 preferably has a volume able to sufficiently store the exhaust gas. For example, the tank 51 preferably has a volume of at least several times the volume of the exhaust pipe 12 which is arranged inside of the tank 51.

At the exhaust pipe 12, a connecting port 61 is formed. The connecting port 61 in the present embodiment is formed at the upstream side from the switching valve 52. The connecting port 61 is used to connect the exhaust pipe 12 and the tank 51. That is, the connection point of the engine exhaust passage and tank is arranged at the upstream side from the switching valve 52.

The exhaust purification system of the present embodiment includes a pressure sensor 55 as a pressure detection device which detects the pressure of the inside of the tank 51. The pressure sensor 55 in the present embodiment is arranged at a wall surface of the tank 51. The output of the pressure sensors 55 is input to an input port 35 of the electronic control unit 30.

In the present embodiment, the switching valve 52 functions as a flow path changing device which shuts the engine exhaust passage toward the oxidation catalyst 17 and changes the flow path so that the exhaust gas flows into the tank. By closing the switching valve 52, the flow path toward the oxidation catalyst 17 is shut. The exhaust gas flows through the connecting port 61 to the tank 51. The tank 51 can store exhaust gas while rising in internal pressure. By opening the switching valve 52, the exhaust gas flows through the exhaust pipe 12 into the oxidation catalyst 17.

The tank which stores the exhaust gas is not limited to the above embodiment. It need only be formed so as to be able to temporarily store exhaust gas. For example, it is also possible to arrange a tank at a part away from the exhaust pipe 12 and to connect the exhaust pipe and the tank by a connecting pipe. Further, the flow path changing device is not limited to a switching valve. It is possible to employ any device which shuts the engine exhaust passage toward the oxidation catalyst and makes the exhaust gas flow into the tank.

Figure 2:
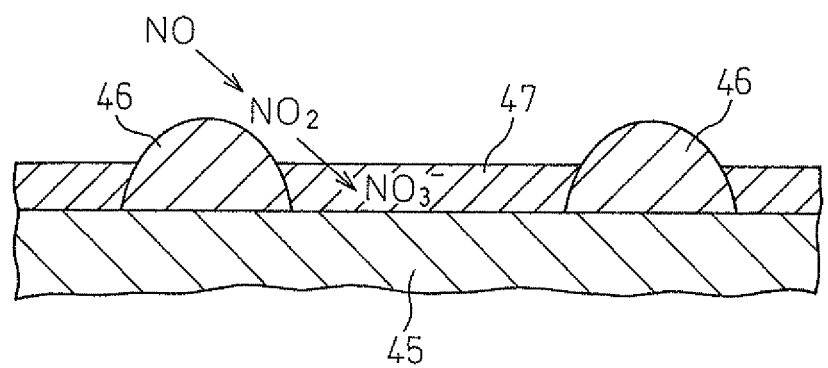
FIG. 2 is a schematic cross-sectional view of an $NO_x$ storage reduction catalyst.

FIG. 2 shows an enlarged schematic cross-sectional view of an $NO_x$ storage reduction catalyst. The $NO_x$ storage reduction catalyst 16 is a catalyst which temporarily stores the $NO_x$ which is contained in the exhaust gas which is exhausted from the engine body 1 and converts the stored $NO_x$ to $N_2$ when releasing it.

The $NO_x$ storage reduction catalyst 16 is comprised of a substrate on which for example a catalyst carrier 45 made of alumina is carried. On the surface of the catalyst carrier 45, a precious metal catalyst 46 is carried dispersed. On the surface of the catalyst carrier 45, a layer of an $NO_x$ absorbent 47 is formed. As the precious metal catalyst 46, for example, platinum Pt is used. As the ingredient forming the $NO_x$ absorbent 47, for example, at least one ingredient selected from potassium K, sodium Na, cesium Cs, or another alkali metal, barium Ba, calcium Ca, or another alkali earth, lanthanum La, yttrium Y, or other rare earth may be used.

If referring to the ratio of the air and fuel (hydrocarbons) which are fed to the engine intake passage, combustion chambers, or the engine exhaust passage as "the air-fuel ratio of the exhaust gas (A/F), when the air-fuel ratio of the exhaust gas is lean (when it is larger than the stoichiometric air-fuel ratio), the NO which is contained in the exhaust gas is oxidized on the precious metal catalyst 46 and becomes $NO_2$. The $NO_2$ is stored in the form of nitrate ions $NO_3^-$ in the $NO_x$ absorbent 47.

As opposed to this, at the time of a rich air-fuel ratio of the exhaust gas (when smaller than the stoichiometric air-fuel ratio) or the stoichiometric air-fuel ratio, the concentration of oxygen in the exhaust gas falls, so the reaction proceeds in the opposite direction ($NO_3^- \rightarrow NO_2$). The nitrate ions $NO_3^-$ inside the $NO_x$ absorbent 47 are released in the form of $NO_2$ from the $NO_x$ absorbent 47. The released $NO_x$ is reduced to $N_2$ by the unburned hydrocarbons or carbon monoxide etc. which are contained in the exhaust gas.

In the present embodiment, the $NO_x$ storage amount which is stored in the $NO_x$ storage reduction catalyst is estimated. For example, a map of the $NO_x$ amount NOXA per unit time based on the engine speed N and fuel injection amount Q as functions is stored in the ROM 32 of the electronic control unit 30. By cumulatively adding the $NO_x$ storage amount per unit time which is calculated in accordance with the operating state, it is possible to calculate the $NO_x$ storage amount at any time.

The oxidation catalyst 17 is a catalyst having an oxidation ability. The oxidation catalyst 17 is, for example, provided with a substrate having partition walls extending in the direction of the flow of the exhaust gas. The substrate is for example formed in a honeycomb structure. The substrate is for example housed in a tubular shaped case. On the surface of the substrate, for example, a catalyst carrier layer constituted by a coat layer is formed by porous oxide powder. The coat layer carries a catalyst metal which is formed by platinum (Pt), rhodium (Rd), palladium (Pd), or other such precious metal. The oxidation catalyst is not limited to this. It is possible to employ any exhaust treatment device having an oxidizing ability. For example, it is possible to arrange a catalyst on which a precious metal which has an oxidizing ability is carried as the oxidation catalyst.

Figure 3:
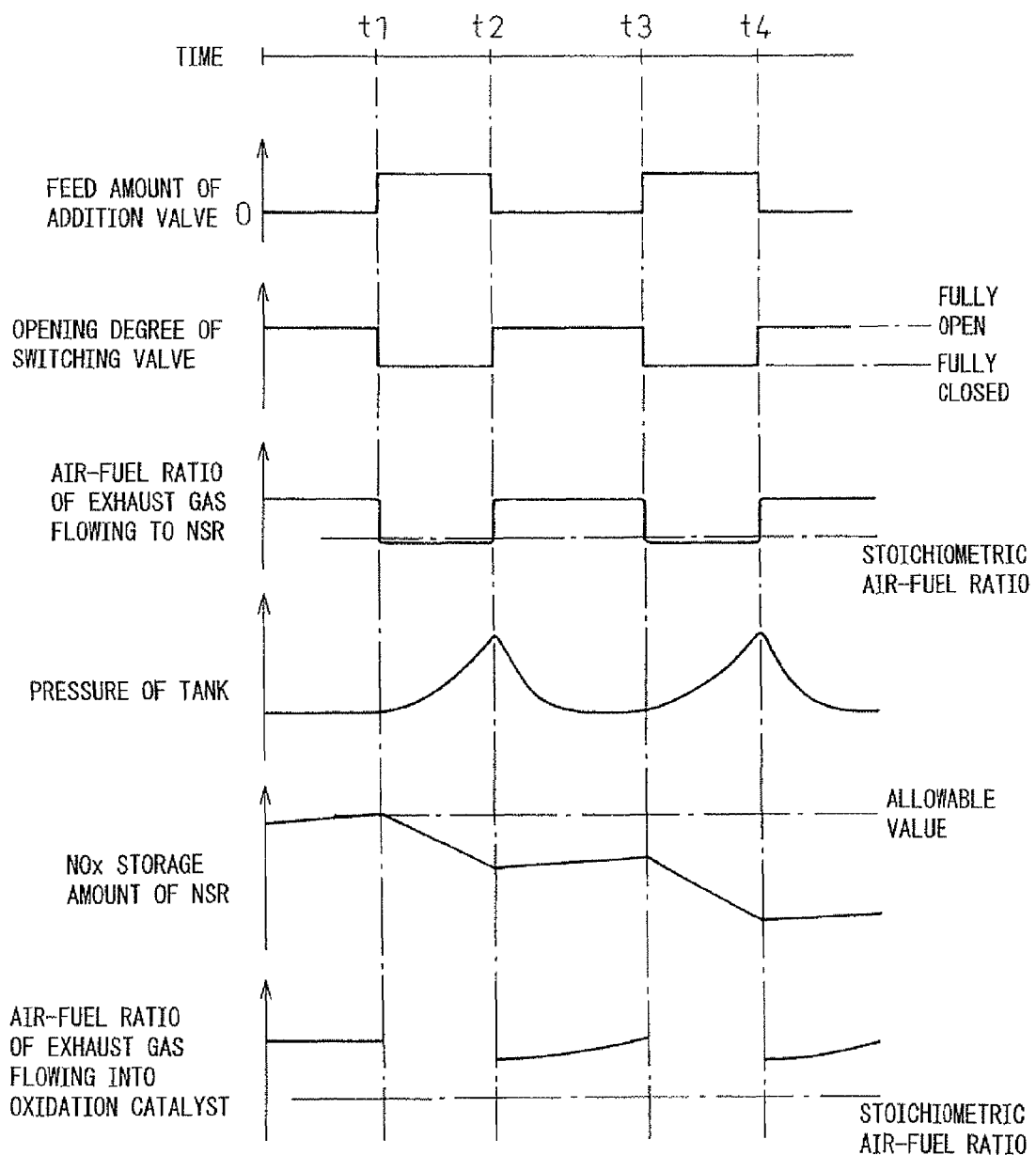
FIG. 3 is a time chart of first operational control in the first embodiment.

FIG. 3 shows a time chart of first operational control in the present embodiment. In the first operational control, control is performed to regenerate the $NO_x$ storage reduction catalyst by making it release $NO_x$. In the present embodiment, unburned fuel is fed, from the fuel addition valve 15 which is arranged in the exhaust pipe 12, to the inside of the engine exhaust passage so as to make the air-fuel ratio of the exhaust gas which flows into the $NO_x$ storage reduction catalyst 16 rich.

Up to the time t1, normal operation is performed. Up to the time t1, the switching valve 52 which is arranged in the engine exhaust passage is in a fully open state.

At the time t1, the $NO_x$ storage amount in the $NO_x$ storage reduction catalyst reaches the allowable value. In the first operational control, from the time t1 to the time t2, fuel is fed from the fuel addition valve 15. In the present embodiment, in the time period from the time t1 to the time t2, fuel is injected consecutively several times from the fuel addition valve. The air-fuel ratio of the exhaust gas which flows into the $NO_x$ storage reduction catalyst 16 becomes rich. At the $NO_x$ storage reduction catalyst 16, the $NO_x$ is released and is reduced to $N_2$.

In the first operational control, in the time period from the time t1 to the time t2, the switching valve 52 is in the fully closed state. By making the switching valve 52 the fully closed state, the engine exhaust passage toward the oxidation catalyst 17 is closed.

Figure 4:
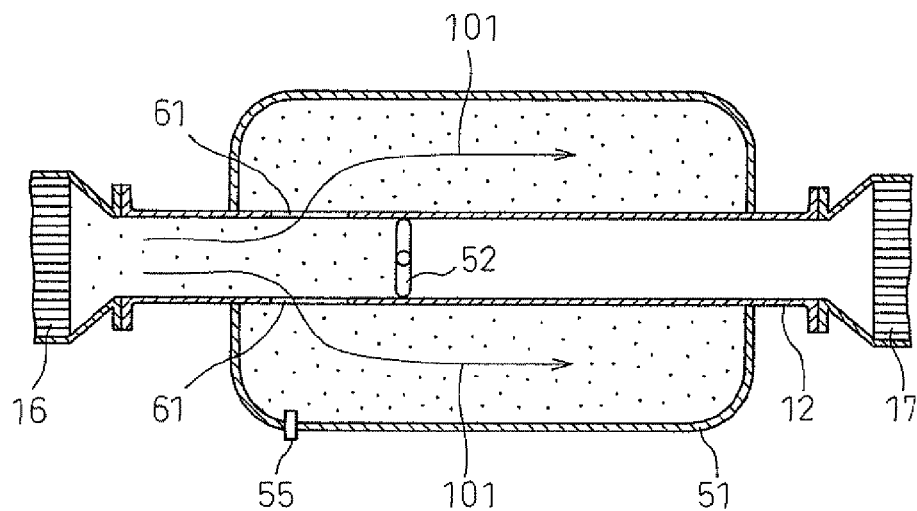
FIG. 4 is a first enlarged schematic cross-sectional view of an exhaust pipe and tank when performing first operational control in the first embodiment.

FIG. 4 shows an enlarged schematic cross-sectional view of the exhaust pipe and tank when making the air-fuel ratio of the exhaust gas which flows into the $NO_x$ storage reduction catalyst rich and closing the switching valve in the first operational control. By closing the switching valve 52, the engine exhaust passage toward the oxidation catalyst 17 is closed. The exhaust gas, as shown by the arrow 101, flows through the connecting port 61 which is formed in the exhaust pipe 12 and flows into the tank 51. The rich air-fuel ratio exhaust gas which flows out from the $NO_x$ storage reduction catalyst is stored in the tank 51.

Referring to FIG. 3, at the time t1, the switching valve 52 is closed, whereby the pressure of the tank 51 rises. At the time t2, the feed of fuel from the fuel addition valve 15 is stopped. By stopping the feed of fuel from the fuel addition valve 15, the air-fuel ratio of the exhaust gas which flows into the $NO_x$ storage reduction catalyst 16 becomes lean. At the time t2, the air-fuel ratio of the exhaust gas becomes lean and the switching valve 52 is fully opened.

Figure 5:
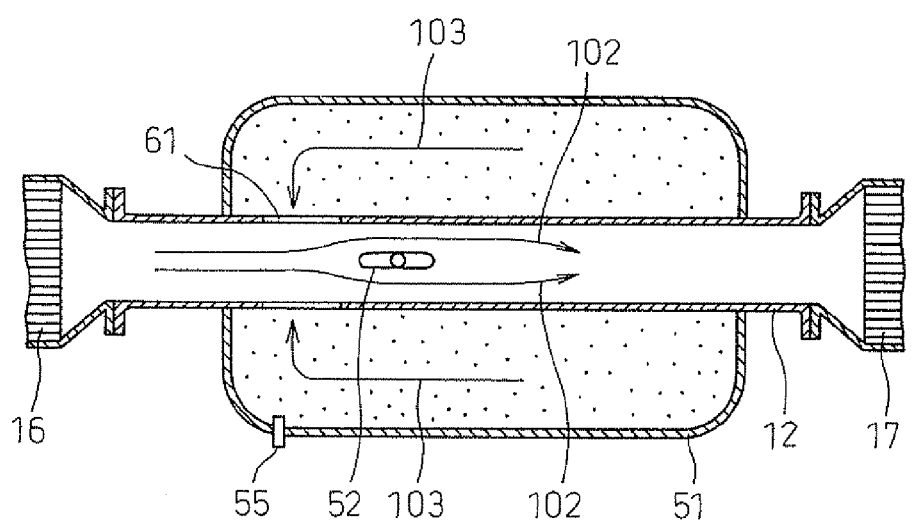
FIG. 5 is a second enlarged schematic cross-sectional view of an exhaust pipe and tank when performing first operational control in the first embodiment.

FIG. 5 shows an enlarged schematic cross-sectional view of the exhaust pipe and tank when changing the switching valve from the closed state to the open state in the first operational control. Inside of the tank 51, rich air-fuel ratio exhaust gas is stored. The exhaust gas which is stored inside of the tank 51, as shown by the arrow 103, passes through the connecting port 61 and flows to the inside of the exhaust pipe 12. Lean air-fuel ratio exhaust gas flows out from the $NO_x$ storage reduction catalyst 16 as shown by the arrow 102.

The rich air-fuel ratio exhaust gas which was stored in the tank 51 and the lean air-fuel ratio exhaust gas which flowed out from the $NO_x$ storage reduction catalyst 16 merge. The exhaust gas of the tank 51 is mixed with the lean exhaust gas which flows out from the $NO_x$ storage reduction catalyst 16 and becomes exhaust gas containing a large amount of oxygen. In the present embodiment, the air-fuel ratio of the exhaust gas which flows into the oxidation catalyst 17 is lean.

The exhaust gas heading to the oxidation catalyst 17 is in a state of excess oxygen. For this reason, at the oxidation catalyst 17, the substance to be oxidized can be oxidized well. For example, the HC, CO, $H_2S$, $NH_3$, etc. which are contained in the exhaust gas can be removed by oxidation. These substances can be converted to for example $CO_2$, $H_2O$, or $SO_2$, etc.

Referring to FIG. 3, by opening the switching valve 52 at the time t2, the pressure of the tank is reduced. The pressure of the tank 51 falls to the pressure at the time of normal operation. It falls down to the pressure of the time t1. From the time t3 on, similar control is repeated. For example, from the time t3 to the time t4, the feed of fuel from the fuel addition valve 15 is performed and the switching valve 52 is closed to release the $NO_x$.

In the present embodiment, it is possible to temporarily store rich air-fuel ratio exhaust gas in the tank. For this reason, in a state where the oxygen which is contained in the exhaust gas becomes insufficient, it is possible to keep the substance to be oxidized from being fed to the oxidation catalyst. As a result, it is possible to keep the substance to be oxidized from running through the oxidation catalyst and being released into the atmosphere.

Further, control is performed to open the switching valve 52 when switching the air-fuel ratio of the exhaust gas which flows into the $NO_x$ storage reduction catalyst from the rich state to the lean state. Due to this control, it is possible to mix the rich air-fuel ratio exhaust gas which was stored in the tank 51 with the lean air-fuel ratio exhaust gas which flows out from the $NO_x$ storage reduction catalyst 16. The exhaust gas which heads toward the oxidation catalyst can be made a state containing a large amount of oxygen and the substance to be removed can be effectively oxidized at the oxidation catalyst.

The device for raising the air-fuel ratio of the rich air-fuel ratio exhaust gas which is stored in the tank is not limited to this. For example, it is also possible to connect a device for further filling air into the tank and to fill air so as to raise the air-fuel ratio.

In the present embodiment, the connecting port 61 which connects the exhaust pipe and tank and the oxidation catalyst 17 are arranged a predetermined distance apart. For this reason, it is possible to sufficiently mix the exhaust gas which flows out from the tank and the exhaust gas which flows out from the $NO_x$ storage reduction catalyst inside of the exhaust pipe 12. As a result, it is possible to avoid parts of a low air-fuel ratio of the exhaust gas from being formed locally. It is therefore possible to keep part of the substance to be oxidized from passing straight through the oxidation catalyst 17 and being released into the atmosphere.

In the first operational control of the present embodiment, the switching valve 52 is fully closed at the same time as starting the feed of fuel from the fuel addition valve, but the invention is not limited to this. It is also possible to cut off the flow of the exhaust gas toward the oxidation catalyst during at least part of the time period in the period during which the air-fuel ratio of the exhaust gas which flows out from the $NO_x$ storage reduction catalyst 16 becomes the stoichiometric air-fuel ratio or rich. Alternatively, it is possible to control the switching valve so as to store in the tank 51 at least part of the stoichiometric air-fuel ratio or rich air-fuel ratio exhaust gas which flows out from the $NO_x$ storage reduction catalyst.

Figure 6:
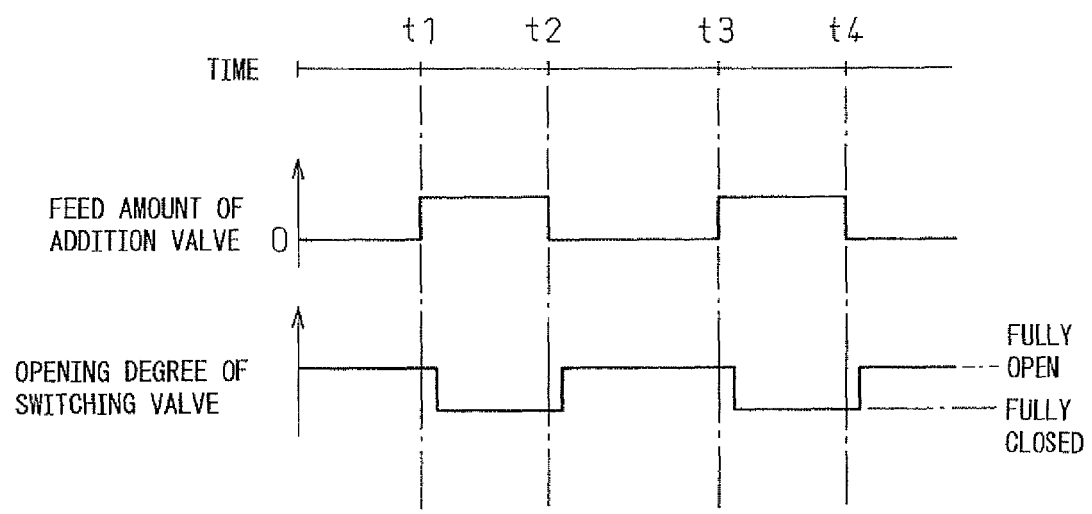
FIG. 6 is a time chart of second operational control in the first embodiment.

FIG. 6 shows a time chart of second operational control in the present embodiment. In the second operational control, the switching valve 52 closed right after the feed of fuel from the fuel addition valve 15 is started at the time t1. The timing for closing the switching valve 52 may be delayed from the time t1 as well.

When the fuel addition valve is arranged a predetermined distance from the connecting port, it takes a predetermined time for rich air-fuel ratio exhaust gas to reach the connecting port. For this reason, when making the air-fuel ratio of the exhaust gas which flows to the $NO_x$ storage reduction catalyst rich, it is also possible to delay the time for closing the switching valve.

Alternatively, considering the operating time of the switching valve or other flow path changing device, it is also possible to close the switching valve right before the air-fuel ratio of the exhaust gas which flows to the $NO_x$ storage reduction catalyst becomes rich. For example, in the example of control shown in FIG. 6, it is also possible to make the opening degree of the switching valve zero right before the time t1.

Further, in the second operational control, at the time t2, the switching valve is opened right after stopping the feed of fuel from the fuel addition valve 15. When the fuel addition valve is arranged far from the connecting port, a predetermined time is required until the lean air-fuel ratio exhaust gas reaches the connecting port. By delaying the time for opening the switching valve from the time for stopping the feed of fuel from the fuel addition valve, it is possible to reliably store rich air-fuel ratio exhaust gas in the tank. That is, it is possible to store in the tank the rich air-fuel ratio exhaust gas which is present from the fuel addition valve to the connecting port at the time when stopping the feed of fuel. Due to this control, the substance to be oxidized can be reliably kept from being released into the atmosphere.

Furthermore, it is also possible to further delay the time for opening the switching valve. It is possible to open the switching valve after the elapse of a predetermined time from after the rich air-fuel ratio exhaust gas flows into the tank 51. Due to this control, it is possible to store lean air-fuel ratio exhaust gas in the tank in addition to rich air-fuel ratio exhaust gas. Inside the tank 51, these exhaust gases can be mixed. It is possible to raise the air-fuel ratio of the exhaust gas which is stored in the tank. It is possible to dilute the exhaust gas which was stored in the tank in advance before merging it with the exhaust gas which flows out from the $NO_x$ storage reduction catalyst. From the time t3 to the time t4, control similar to that from the time t1 to the time t2 is repeated.

Figure 7:
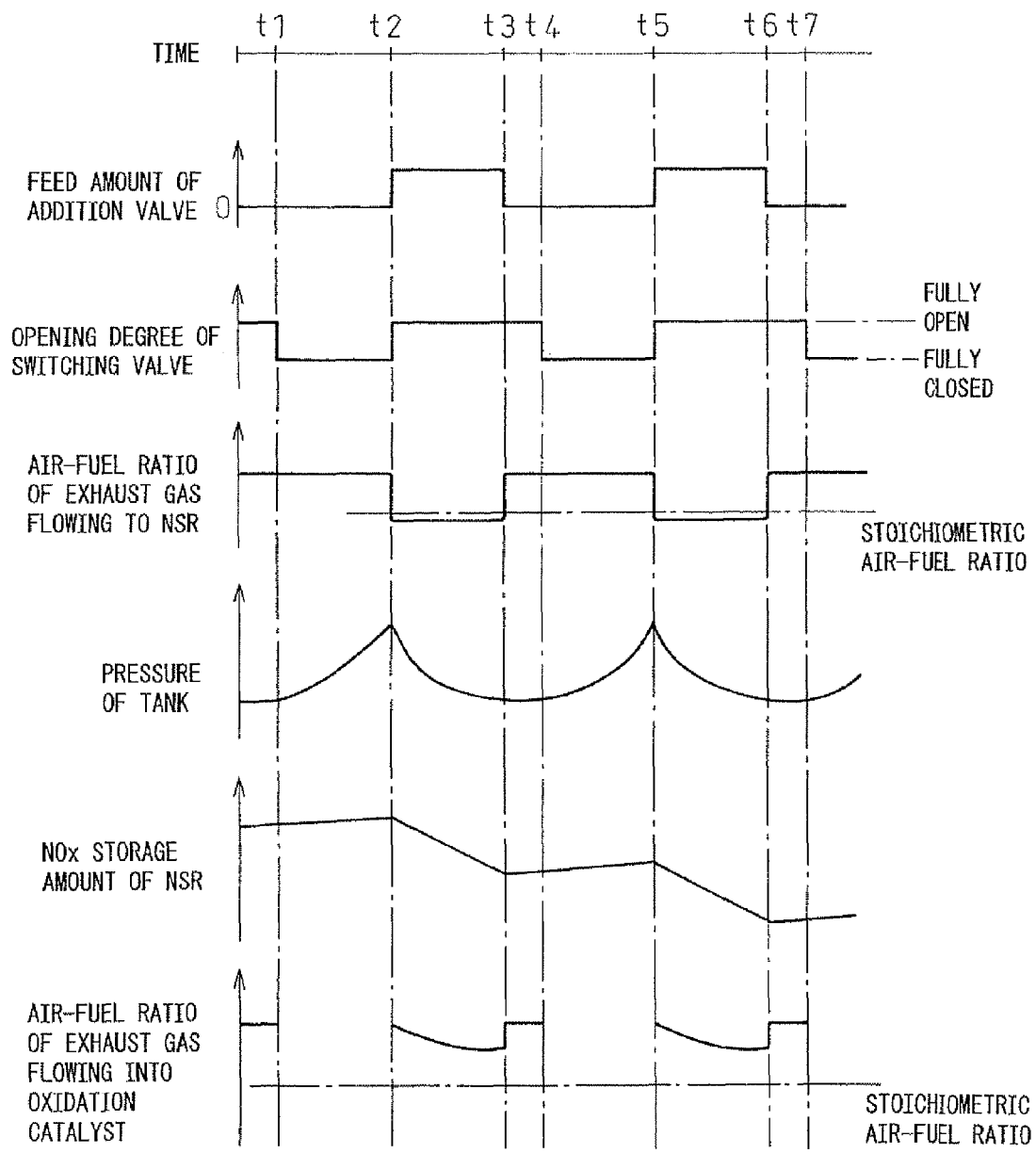
FIG. 7 is a time chart of third operational control in the first embodiment.

FIG. 7 shows a time chart of third operational control in the present embodiment. In the third operational control as well, control is performed to regenerate the $NO_x$ storage reduction catalyst by making it release the $NO_x$.

Normal operation is continued until the time t1. At the time t1, the switching valve 52 is closed. The switching valve 52 is closed before feeding fuel from the fuel addition valve 15. The lean air-fuel ratio exhaust gas is stored in the tank 51. The pressure of the tank 51 rises. By feeding fuel from the fuel addition valve 15 from the time t2 to the time t3, the air-fuel ratio of the exhaust gas which flows into the $NO_x$ storage reduction catalyst is made rich. The $NO_x$ storage reduction catalyst is made to release the $NO_x$. In the third operational control, at the time t2, the switching valve 52 is opened. When making the air-fuel ratio of the exhaust gas rich, the switching valve 52 is opened.

Figure 8:
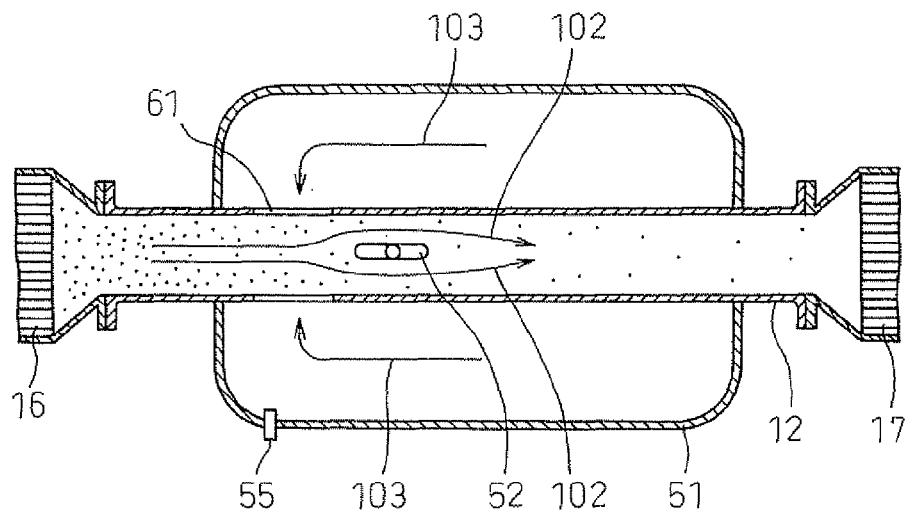
FIG. 8 is an enlarged schematic cross-sectional view of an exhaust pipe and tank when performing third operational control in the first embodiment.

FIG. 8 shows an enlarged schematic cross-sectional view of the exhaust pipe and tank when the air-fuel ratio of the exhaust gas flowing into the $NO_x$ storage reduction catalyst becomes rich. Rich air-fuel ratio exhaust gas flows out from the $NO_x$ storage reduction catalyst 16. By opening the switching valve 52, as shown by the arrow 103, the lean exhaust gas which was stored at the tank 51 flows through the connecting port 61 to the inside of the exhaust pipe 12.

The lean air-fuel ratio exhaust gas is mixed with the rich air-fuel ratio exhaust gas which flows out from the $NO_x$ storage reduction catalyst 16. As shown by the arrow 102, the mixed exhaust gas heads toward the oxidation catalyst 17. By mixing the lean exhaust gas with the rich air-fuel ratio exhaust gas which flows out from the $NO_x$ storage reduction catalyst, it is possible to make the air-fuel ratio of the exhaust gas which heads toward the oxidation catalyst 17 lean. It is possible to include more oxygen than the amount of oxygen required for oxidizing the substance to be oxidized. For this reason, the oxidation catalyst 17 can effectively oxidize the substance to be oxidized.

Referring to FIG. 7, at the time t2, the switching valve is opened to reduce the pressure of the tank. In the example of control shown in FIG. 7, the switching valve is kept in the open state until the time t4. At the time t4, the switching valve is fully closed and the tank again stores lean air-fuel ratio exhaust gas. From the time t5 to the time t7, control similar to that from the time t2 to the time t4 is repeated.

In the third operational control, during the time period when the air-fuel ratio of the exhaust gas which flows into the $NO_x$ storage reduction catalyst is lean, the engine exhaust passage toward the oxidation catalyst is closed and the flow path is switched so that the exhaust gas flows into the tank. The tank stores lean air-fuel ratio exhaust gas. After this, the air-fuel ratio of the exhaust gas which flows into the $NO_x$ storage reduction catalyst is made rich and the switching valve is opened to mix the lean exhaust gas which is stored in the tank with the rich air-fuel ratio exhaust gas which flows out from the $NO_x$ storage reduction catalyst. In this way, the air-fuel ratio of the exhaust gas which flows into the oxidation catalyst is made lean. The exhaust gas which flows into the oxidation catalyst contains sufficient oxygen and can effectively oxidize the substance to be oxidized.

In the example of control shown in FIG. 7, at the time t2, the feed of fuel from the fuel addition valve and the operation of opening the switching valve are performed substantially simultaneously, but the invention is not limited to this. It is also possible to open the switching valve right before or right after feeding the fuel. It is also possible to open the switching valve for at least part of the time period in the time period during which rich air-fuel ratio exhaust gas flows out from the $NO_x$ storage reduction catalyst so that the exhaust gas which flows out from the $NO_x$ storage reduction catalyst and the exhaust gas of the tank are controlled to be mixed.

In the above operational control, the example of control making the air-fuel ratio of the exhaust gas which flows into the $NO_x$ storage reduction catalyst rich so as to release the $NO_x$ was used for the explanation, but the invention is not limited to this. Similar control may be performed even when making the air-fuel ratio of the exhaust gas which flows into the $NO_x$ storage reduction catalyst the stoichiometric air-fuel ratio.

In the above operational control, when opening the switching valve, the opening degree is made fully open, but the invention is not limited to this. The switching valve may also be rendered into a state where it is partially opened. Further, when closing the switching valve, the opening degree is made fully closed, but the invention is not limited to this. It is sufficient that engine exhaust passage toward the oxidation catalyst be substantially shut and be closed so that the pressure inside of the tank does not rise.

In the present embodiment, as a fuel feed device for feeding unburned fuel to the engine exhaust passage, a fuel addition valve is arranged, but the invention is not limited to this. Any fuel feed device which can feed unburned fuel to the engine exhaust passage can be employed. For example, it is possible to feed unburned fuel to the engine exhaust passage by changing the injection pattern of the fuel at the combustion chambers.

Figure 9:
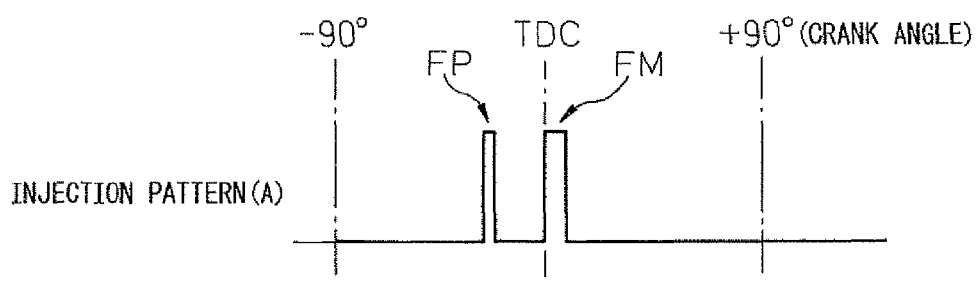
FIG. 9 is an injection pattern in a combustion chamber at the time of normal operation.

FIG. 9 shows an injection pattern of fuel at the time of normal operation of the internal combustion engine in the present embodiment. The injection pattern A is the injection pattern of fuel at the time of normal operation. At the time of normal operation, main injection FM is performed at about compression top dead center TDC. The main injection FM is performed when the crank angle is about 0°. Further, to stabilize the combustion of the main injection FM, pilot injection FP is performed before the main injection FM.

Figure 10:
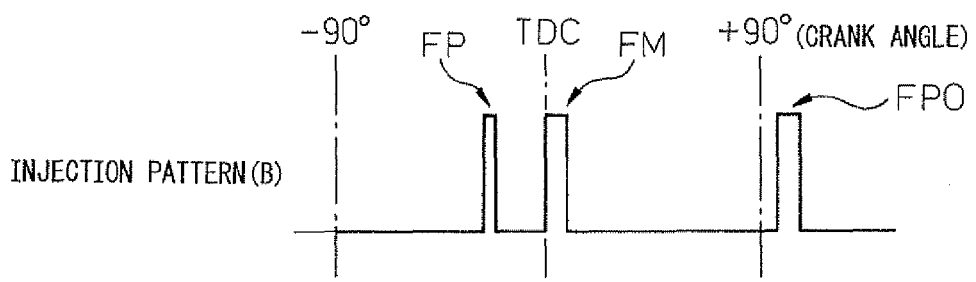
FIG. 10 is an injection pattern in a combustion chamber at the time of feeding unburned fuel to an engine exhaust passage.

FIG. 10 shows an injection pattern when feeding unburned fuel to the engine exhaust passage. The injection pattern B performs main injection FM, then post injection FPO. The post injection FPO is injection performed at a timing when the fuel will not burn in the combustion chamber. The post injection FPO is auxiliary injection. The post injection FPO is, for example, performed in the range of a crank angle after compression top dead center of about 90° to about 120°. By performing post injection, it is possible to feed unburned fuel to the engine exhaust passage.

Further, the auxiliary injection which is performed after the main injection is not limited to post injection. After-injection which is performed at timing when at least part of the fuel which is injected to the combustion chambers burn may also be adopted.

In the above explanation, the release of $NO_x$ was explained in the regeneration of the $NO_x$ storage reduction catalyst, but the invention is not limited to this. Regeneration which releases the $SO_x$ which is stored in the $NO_x$ storage reduction catalyst can also be applied to the present invention.

The exhaust gas of an internal combustion engine sometimes contains sulfur oxides ($SO_x$). In this case, the $NO_x$ storage reduction catalyst stores $NO_x$ and simultaneously stores $SO_x$. If $SO_x$ is stored, the storable amount of $NO_x$ falls. In this way, the $NO_x$ storage reduction catalyst undergoes what is called "sulfur poisoning". To eliminate sulfur poisoning, sulfur poisoning recovery treatment is performed for releasing the $SO_x$. $SO_x$ is stored in the $NO_x$ storage reduction catalyst in a state stabler than $NO_x$. For this reason, in the sulfur poisoning recovery treatment, the NO storage reduction catalyst is raised in temperature, then rich air-fuel ratio exhaust gas or stoichiometric air-fuel ratio exhaust gas is fed so as to release the $SO_x$.

In calculation of the $SO_x$ amount which is stored at the $NO_x$ storage reduction catalyst, in the same way as calculation of the stored NO amount, a map of the stored amount of $SO_x$ per unit time based on the engine speed and fuel injection amount as functions is stored in the electronic control unit. By cumulatively adding the amounts of $SO_x$ stored per unit time, it is possible to calculate the stored amount of $SO_x$ at any time. If the stored amount of $SO_x$ exceeds an allowable value, control may be performed for regeneration to make the catalyst release $SO_N$.

To recover sulfur poisoning, any method may be used to raise the temperature of the $NO_x$ storage reduction catalyst to a temperature enabling release of $SO_x$. Next, the control in the present embodiment is performed to make the air-fuel ratio of the exhaust gas which flows to the $NO_x$ storage reduction catalyst rich or the stoichiometric air-fuel ratio. The $NO_x$ storage reduction catalyst can be made to release the $SO_x$.

Figure 11:
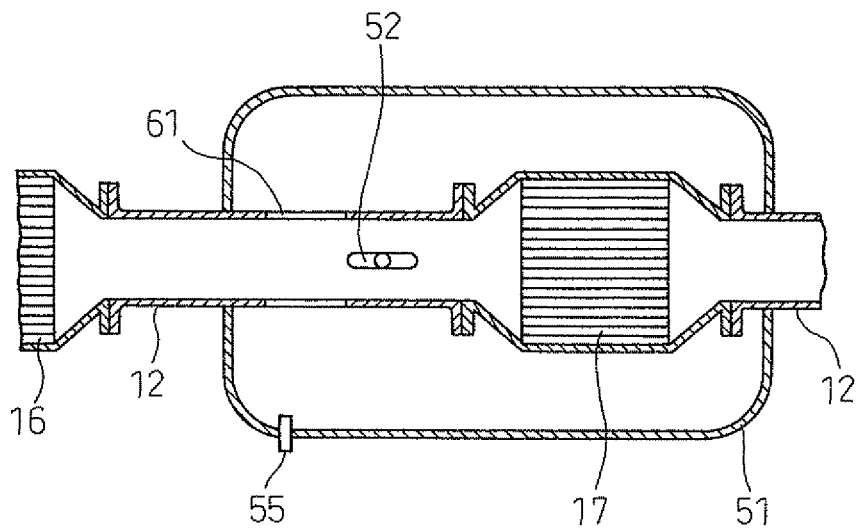
FIG. 11 is an enlarged schematic cross-sectional view of an exhaust pipe and tank of another exhaust purification system of an internal combustion engine in the first embodiment.

FIG. 11 shows an enlarged schematic cross-sectional view of the exhaust pipe and tank of a second exhaust purification system of an internal combustion engine in the present embodiment. The second exhaust purification system of an internal combustion engine has an oxidation catalyst 17 arranged inside the tank 51. The tank 51 is formed to extend along the exhaust pipe 12. The volume of the tank 51 is formed by the space surrounded by the inside walls of the tank 51 and the outside walls of the exhaust pipe 12 and oxidation catalyst 17.

By having the oxidation catalyst 17 arranged inside of the tank 51, it is possible to increase the length of the tank 51 in the direction extending along the exhaust pipe 12 and possible to reduce the diameter of the tank 51. Alternatively, it is possible to arrange the tank 51 in a small space.

Further, the tank 51 has the effect of keeping the oxidation catalyst 17 warm. That is, the gas inside of the tank 51 acts as an heat insulator and can suppress dissipation of heat from the oxidation catalyst 17. For example, the oxidation catalyst 17 can be kept from falling below the activation temperature.

Second Embodiment

Figure 12:
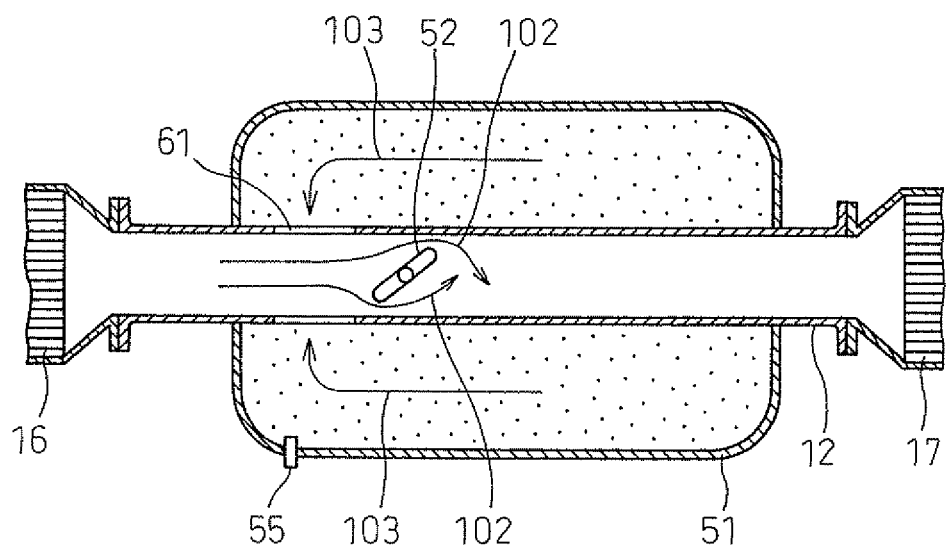
FIG. 12 is an enlarged schematic cross-sectional view of an exhaust pipe and tank when performing first operational control in the second embodiment.
Figure 13:
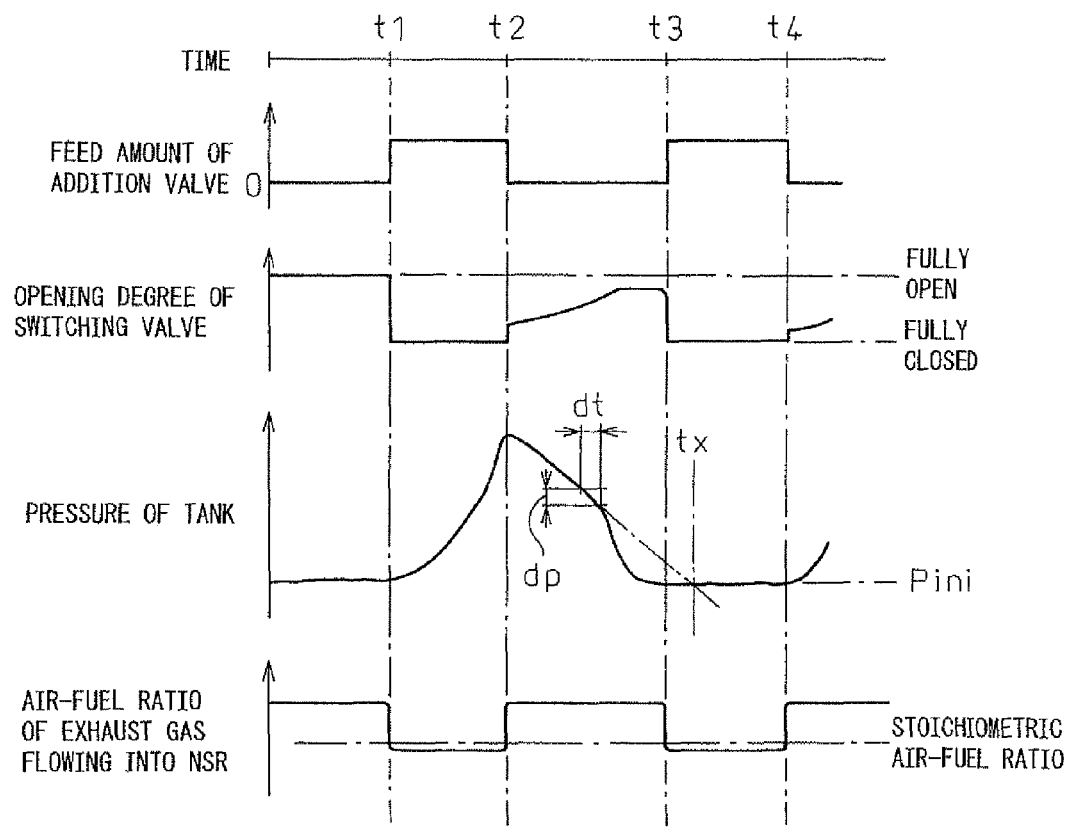
FIG. 13 is a time chart of second operational control in a second embodiment.

Referring to FIG. 12 and FIG. 13, an exhaust purification system of an internal combustion engine of a second embodiment will be explained. The exhaust purification system in the present embodiment is provided with a flow path changing device which has the function of adjusting the flow rate of the exhaust gas.

FIG. 12 shows an enlarged schematic cross-sectional view of an exhaust pipe and tank in the exhaust purification system of the present embodiment. The flow path changing device in the present embodiment includes a switching valve 52. The switching valve 52 in the present embodiment is a butterfly valve and is formed so as to be able to pivot. The switching valve 52 is formed so that the plate-shaped member can be stopped at any angle. The switching valve 52 is formed so as to enable adjustment of the opening degree. The switching valve 52 is formed so as to enable adjustment of the flow rate of the exhaust gas toward the oxidation catalyst 17.

In the first operational control of the present embodiment, the switching valve 52 is closed to store the rich air-fuel ratio exhaust gas in the tank 51 in the time period when the air-fuel ratio of the exhaust gas which flows into the $NO_x$ storage reduction catalyst 16 is rich. FIG. 12 is a cross-sectional view after the air-fuel ratio of the exhaust gas which flows into the $NO_x$ storage reduction catalyst is switched from rich to lean. The lean air-fuel ratio exhaust gas which flows out from the $NO_x$ storage reduction catalyst 16 is mixed with the rich air-fuel ratio exhaust gas which was stored in the tank 51.

In the first operational control of the present embodiment, the switching valve 52 stops at the angle where the greatest area surface of the plate-shaped member is inclined with respect to the direction of flow of the exhaust gas. That is, the switching valve 52 is stopped at an intermediate extent of opening degree rather than being fully opened.

By making the switching valve 52 stop at an angle where the greatest area surface of the plate-shaped member is inclined with respect to the direction of the flow of the exhaust gas, as shown by the arrow 102, the flow of the exhaust gas which flows through the exhaust pipe 12 is disturbed. At the downstream side of the switching valve 52, the exhaust gas can be sufficiently mixed. As a result, it is possible to keep the concentration of the substance to be oxidized in the exhaust gas which flows into the oxidation catalyst 17 from becoming locally high and possible to avoid the substance to be oxidized passing straight through.

By making the opening degree of the switching valve 52 smaller, that is, by making the flow sectional area smaller, the flow of the exhaust gas can be disturbed more. However, if the opening degree of the switching valve 52 is too small, the pressure loss becomes larger and it takes time for the pressure of the exhaust gas in the tank 51 to drop. The switching valve 52 is preferably set to an opening degree so that the pressure of the tank 51 returns to the pressure at the time of normal operation within a predetermined time.

In the present embodiment, a butterfly valve able to be adjusted in opening degree is arranged in the engine exhaust passage, but the invention is not limited to this. It is possible to employ any flow path changing device which enables the flow rate to be changed. Further, it is also possible to arrange an agitating member for disturbing the flow inside of the exhaust pipe so as to disturb the flow of the air-fuel mixture. For example, as the agitating member, it is also possible to arrange a baffle plate which disturbs the flow at the inside of the exhaust pipe.

FIG. 13 shows a time chart of second operational control in the present embodiment. In the second operational control, control is performed several times to make the air-fuel ratio of the exhaust gas which flows into the $NO_x$ storage reduction catalyst rich. In the second operational control, control is performed so that the pressure of the tank falls to the pressure of normal operation while the air-fuel ratio of the exhaust gas is lean.

Up to the time t1, normal operation is performed. At the time t1, the feed of fuel from the fuel addition valve 15 started and the switching valve 52 is closed. The air-fuel ratio of the exhaust gas which flows into the $NO_x$ storage reduction catalyst 16 is made rich. Up to the time t2, the feed of fuel from the fuel addition valve 15 is continued. At the time t2, the feed of fuel from the fuel addition valve 15 is stopped and the switching valve 52 is made partially opened.

In the present embodiment, the pressure sensor 55 is used to detect the pressure P inside of the tank 51 (see FIG. 12). The pressure Pini at the time of normal operation is stored in the RAM 33 of the electronic control unit 30. In the present embodiment, the pressure Pini at the time t1 is stored as the initial pressure.

In the present embodiment, the time from the time t2 to the time t3 where the air-fuel ratio of the exhaust gas becomes lean is set in advance. In the period from the time t2 to the time t3, the pressure drop dP at the short time dt is detected. That is, the pressure drop rate at the lean air-fuel ratio period is calculated. It is possible to use the calculated pressure drop rate to predict the time tx by which the pressure P of the tank 51 returns to the pressure Pini at the time of normal operation. If this time tx is delayed from the time t3 for next making the air-fuel ratio rich, feedback control is performed for increasing the opening degree of the switching valve 52 more.

By performing this control, it is possible to return the pressure P of the tank 51 to the pressure Pini at the time of normal operation before the time t3 where the air-fuel ratio of the exhaust gas is next made rich. When performing control for making the air-fuel ratio of the exhaust gas rich several times, the pressure of the tank 51 can be kept from rising at each period when the air-fuel ratio of the exhaust gas is made rich. In the example of control shown in FIG. 13, at the time t2, the switching valve is partially opened. After that, the opening degree of the switching valve gradually becomes larger and becomes constant when reaching a predetermined the opening degree.

From the time t3 to the time t4, control similar to that from the time t1 to the time t2 is performed. After the time t4 as well, similar control can be performed in the control for making the air-fuel ratio of the exhaust gas rich several times.

In the second operational control, over the entire period from the time t2 to the time t3, control is repeatedly performed to calculate the pressure drop rate of the tank and set the opening degree of the switching valve, but the invention is not limited to this. It is also possible to perform control to adjust the opening degree of the switching valve based on the pressure drop rate of the tank at any time period in the period during which the air-fuel ratio of the exhaust gas is lean.

The rest of the configuration, action, and effects are similar to the first embodiment, so the explanation will not be repeated here.

Third Embodiment

Figure 14:
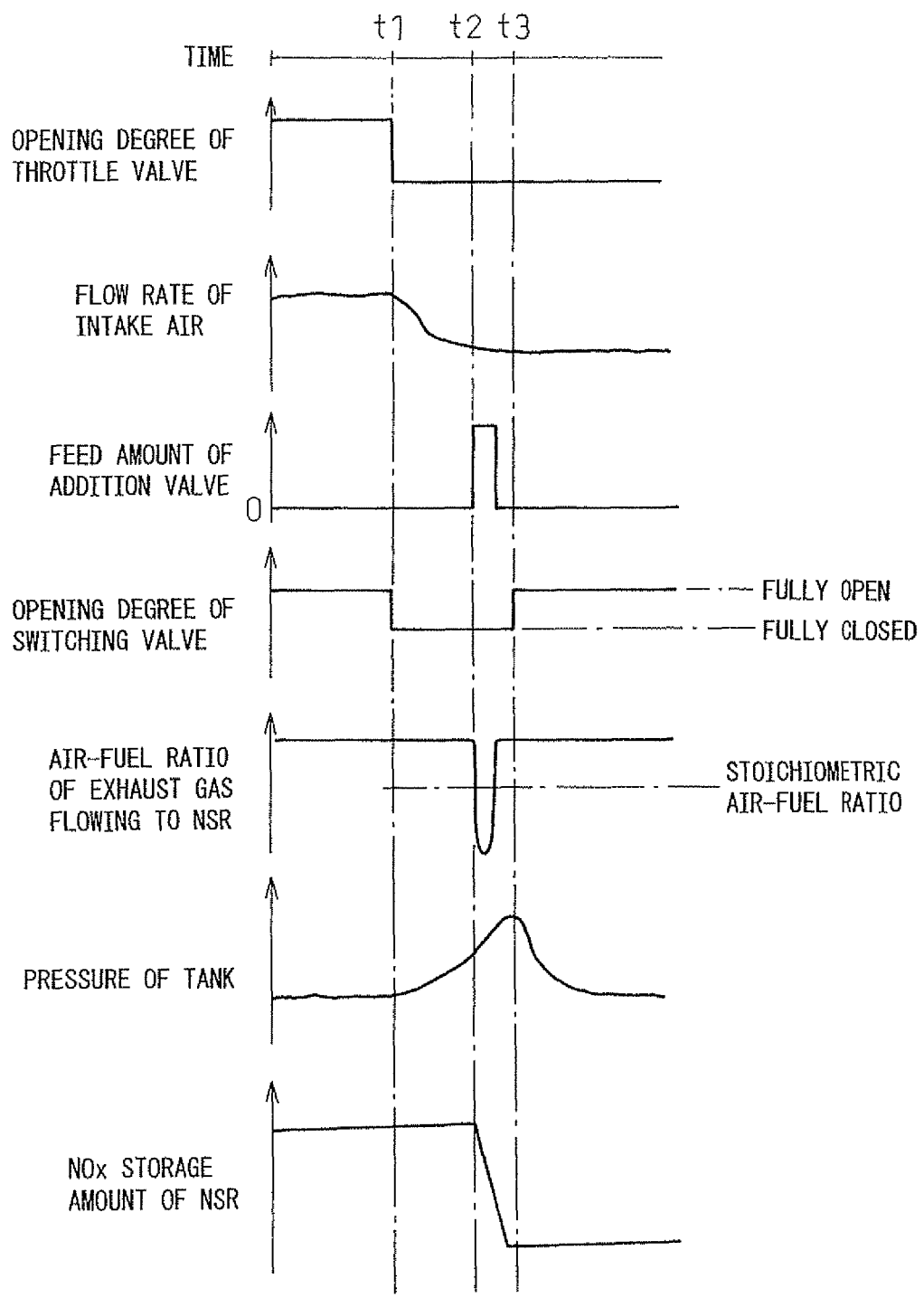
FIG. 14 is a time chart of first operational control in a third embodiment.

Referring to FIG. 14 and FIG. 15, an exhaust purification system of an internal combustion engine in a third embodiment will be explained. The internal combustion engine in the present embodiment is provided with a supercharger.

FIG. 14 is a time chart of first operational control in the present embodiment. In the first operational control, when the opening degree of the throttle valve is reduced and speed of the internal combustion engine is reduced, fuel is fed to the engine exhaust passage so as to make the $NO_x$ storage reduction catalyst release $NO_x$.

Up to the time t1, the accelerator pedal 40 has been depressed by a predetermined amount (see FIG. 1). The throttle valve 10 opens by a predetermined opening degree, and the internal combustion engine outputs a predetermined torque. At the time t1, the accelerator pedal 40 is returned to its original position and deceleration is started. The opening degree of the throttle valve 10 becomes smaller and a fuel cut is performed for stopping the injection of fuel from the fuel injectors 3.

The flow rate of the intake air flowing into the engine body 1 is reduced from the time t1. At this time, even if the accelerator pedal 40 is returned to its original position, the exhaust turbocharger 7 will continue turning for a while due to inertia. For this reason, the intake air flow rate will gradually decrease without sharply decreasing.

In the first operational control, at the time t1, the switching valve 52 is changed from an open state to a closed state. The period during which the intake air flow rate is reduced is utilized to store lean air-fuel ratio exhaust gas in the tank 51. At the time t2, the intake air flow rate falls and becomes substantially constant. The spatial velocity of the exhaust gas at the $NO_x$ storage reduction catalyst 16 becomes slower.

At the time t2, fuel is fed from the fuel addition valve 15. In the present embodiment, rich spike control is performed to make the air-fuel ratio of the exhaust gas which flows into the $NO_x$ storage reduction catalyst 16 deeply rich. By increasing the fuel which is fed from the fuel addition valve 15 per unit time, it is possible to make the air-fuel ratio of the exhaust gas deeply rich. At the $NO_x$ storage reduction catalyst, $NO_x$ is released.

In the first operational control, at the time t3 after the rich spike control, the switching valve 52 is opened. The exhaust gas which flows into the $NO_x$ storage reduction catalyst for release and reduction of $NO_x$ is mixed with the lean air-fuel ratio exhaust gas which is stored in the tank. The air-fuel mixture flows into the oxidation catalyst with a lean air-fuel ratio of the exhaust gas. In the oxidation catalyst, the substance to be oxidized can be effectively oxidized.

In the first operational control of the present embodiment, it is possible to utilize the supercharging residual pressure right after start of deceleration so as to store lean air-fuel ratio exhaust gas in the tank. When the intake air flow rate decreases and the spatial velocity at the $NO_x$ storage reduction catalyst becomes low, it is possible to make the air-fuel ratio of the exhaust gas rich so as to lengthen the reaction time at the $NO_x$ storage reduction catalyst. As a result, it is possible to suitably regenerate the $NO_x$ storage reduction catalyst.

In the first operational control, the switching valve is opened after rich spike control, but the invention is not limited to this. It is also possible to open the switching valve substantially simultaneously with the start of rich control spike. Alternatively, it is also possible to open the switching valve immediately before rich spike control.

FIG. 15 shows a time chart of second operational control in the present embodiment. In the second operational control, the regeneration of the $NO_x$ storage reduction catalyst when stopping the internal combustion engine will be explained.

Up to the time t1, the engine body is operating. Up to the time t1, for example, it is continuing to operate in an idling state. At the time t1, a signal for stopping the internal combustion engine is emitted. At the time t1 on, the engine speed falls along with time. The intake air flow rate similarly decreases. At the time t3, along with the stopping of the engine body, the intake air flow rate becomes zero.

In the second operational control, at the time t2 right after the time t1, the switching valve is switched from an open state to a closed state. The engine exhaust passage toward the oxidation catalyst is shut. From the time t2, exhaust gas is stored in the tank. The pressure of the tank rises from the time t2 to the time t3.

In the second operational control, in the period until the speed of the engine body becomes zero, unburned fuel is fed from the fuel addition valve to release the $NO_x$. In the second operational control, at the time t2, rich spike control is performed to make the air-fuel ratio of the exhaust gas which flows to the $NO_x$ storage reduction catalyst deeply rich. At this time, the switching valve is closed, so the tank stores rich air-fuel ratio exhaust gas. After this, the engine body is stopped while maintaining the switching valve in the fully closed state.

At the time t4, the internal combustion engine is restarted. At the time t4, the switching valve is open. The engine exhaust passage heading toward the oxidation catalyst is opened. The rich air-fuel ratio exhaust gas which was stored in the tank before stopping is mixed with the lean air-fuel ratio exhaust gas which flows out from the $NO_x$ storage reduction catalyst. For this reason, lean air-fuel ratio exhaust gas can be fed to the oxidation catalyst. At the time t4, the switching valve is opened to thereby reduce the pressure in the tank. At the time t5, the engine body is in the idling state.

In this way, when the engine body should be stopped, even if performing control to make the air-fuel ratio of the exhaust gas flowing into the NO storage reduction catalyst rich, at the time of restart, mixing with lean air-fuel ratio exhaust gas is possible so the substance to be oxidized can be effectively oxidized.

In the second operational control, fuel is fed from the fuel addition valve after a stop signal of the engine body is emitted, but the invention is not limited to this embodiment. It is also possible to feed the fuel from the fuel addition valve substantially simultaneously with the emission of the signal for stopping the engine body. Further, it is also possible to close the switching valve substantially simultaneously with the emission of the signal for stopping the engine body.

When a signal for stopping the internal combustion engine is emitted right after feeding unburned fuel to the engine exhaust passage, it is possible to maintain the opening degree of the switching valve in the fully closed state over the stopping period of the internal combustion engine in the same way as the second operational control.

In the present embodiment, rich spike control which makes the air-fuel ratio of the exhaust gas deeply rich is used to regenerate the $NO_x$ storage reduction catalyst, but the invention is not limited to this. It is also possible to make the air-fuel ratio of the exhaust gas shallowly rich or the stoichiometric air-fuel ratio so as to regenerate the $NO_x$ storage reduction catalyst.

The rest of the configuration, action, and effects are similar to the first embodiment or second embodiment, so the explanation will not be repeated here.

The above embodiments may be suitably combined.

In the above figures, the same or corresponding parts are assigned the same reference notations. Note that the above embodiments are illustrations and do not limit the invention. Further, the embodiments include changes shown in the claims.

REFERENCE SIGNS LIST 1 engine body
2 combustion chamber
3 fuel injector
7 exhaust turbocharger
12 exhaust pipe
15 fuel addition valve
16 $NO_x$ storage reduction catalyst
17 oxidation catalyst
30 electronic control unit
51 tank
52 switching valve
55 pressure sensor
61 connecting port

The invention claimed is:

1. An exhaust purification system of an internal combustion engine which is provided with
an $NO_x$ storage reduction catalyst which is arranged in an engine exhaust passage, stores $NO_x$ which is contained in exhaust gas when an air-fuel ratio of inflowing exhaust gas is lean, and releases the stored $NO_x$ when the air-fuel ratio of the inflowing exhaust gas becomes a stoichiometric air-fuel ratio or rich,
an oxidation catalyst which is arranged downstream of the $NO_x$ storage reduction catalyst in the engine exhaust passage,
an exhaust gas tank which is connected to the engine exhaust passage between the $NO_x$ storage reduction catalyst and the oxidation catalyst, and
a flow path changing device which closes the engine exhaust passage from the $NO_x$ storage reduction catalyst toward the oxidation catalyst and makes the exhaust gas flow into the tank, wherein
when making the air-fuel ratio of the exhaust gas which flows into the $NO_x$ storage reduction catalyst the stoichiometric air-fuel ratio or rich, the system closes the engine exhaust passage toward the oxidation catalyst and changes the flow path so that the exhaust gas flows into the tank and at least part of the stoichiometric air-fuel ratio or rich air-fuel ratio exhaust gas which flows out from the $NO_x$ storage reduction catalyst is stored in the tank.

2. An exhaust purification system of an internal combustion engine as set forth in claim 1, which switches the air-fuel ratio of the exhaust gas which flows into the $NO_x$ storage reduction catalyst from the stoichiometric air-fuel ratio or rich state to the lean state and opens the engine exhaust passage toward the oxidation catalyst so as to mix exhaust gas which was stored in the tank and exhaust gas which flows out from the $NO_x$ storage reduction catalyst while feeding exhaust gas to the oxidation catalyst.

3. An exhaust purification system of an internal combustion engine as set forth in claim 1, wherein
the tank is formed so as to extend along the engine exhaust passage, and
the oxidation catalyst is arranged inside of the tank.

4. An exhaust purification system of an internal combustion engine as set forth in claim 2, wherein
the system is provided with a pressure detection device which detects a pressure inside the tank,
the system is formed so as to perform control for repeating a period where the air-fuel ratio of the exhaust gas which flows into the $NO_x$ storage reduction catalyst is the stoichiometric air-fuel ratio or rich and a period where the air-fuel ratio is lean,
the system is formed so that when the flow path changing device opens the engine exhaust passage toward the oxidation catalyst, it is possible to adjust the flow rate of the exhaust gas which flows into the oxidation catalyst,
the system estimates a pressure drop speed in the tank in the time period when opening the engine exhaust passage toward the oxidation catalyst and uses the estimated pressure drop speed and a predetermined time period for maintaining the air-fuel ratio of the exhaust gas lean as the basis so as to adjust the flow rate of the exhaust gas flowing into the oxidation catalyst so that the pressure of the tank falls to the pressure before storing of the exhaust gas before the time of the end of the time period for maintaining the air-fuel ratio of the exhaust gas lean.

5. An exhaust purification system of an internal combustion engine as set forth in claim 2, wherein
the system is an exhaust purification system of an internal combustion engine which makes the air-fuel ratio of the exhaust gas which flows into the $NO_x$ storage reduction catalyst the stoichiometric air-fuel ratio or rich when the engine body should be stopped, and which
closes the engine exhaust passage toward the oxidation catalyst when stoichiometric air-fuel ratio or rich exhaust gas flows into the $NO_x$ storage reduction catalyst and stops the engine body in the state with the engine exhaust passage closed and
opens the flow path toward the oxidation catalyst when restarting the engine body.

6. An exhaust purification system of an internal combustion engine which is provided with
an NO storage reduction catalyst which is arranged in an engine exhaust passage, stores $NO_x$ which is contained in exhaust gas when an air-fuel ratio of inflowing exhaust gas is lean, and releases the stored $NO_x$ when the air-fuel ratio of the inflowing exhaust gas becomes a stoichiometric air-fuel ratio or rich,
an oxidation catalyst which is arranged downstream of the $NO_x$ storage reduction catalyst in the engine exhaust passage, an exhaust gas tank which is connected to the engine exhaust passage between the $NO_x$ storage reduction catalyst and the oxidation catalyst, and a flow path changing device which closes the engine exhaust passage from the $NO_x$ storage reduction catalyst toward the oxidation catalyst and makes the exhaust gas flow into the tank, wherein, in the period when the air-fuel ratio of the exhaust gas which flows into the $NO_x$ storage reduction catalyst is lean, the system closes the engine exhaust passage toward the oxidation catalyst and switches the flow path so that the exhaust gas flows into the tank so as to store at least part of the lean air-fuel ratio exhaust gas which flows out from the NO storage reduction catalyst in the tank, and, when making the air-fuel ratio of the exhaust gas which flows into the $NO_x$ storage reduction catalyst the stoichiometric air-fuel ratio or rich, the system opens the engine exhaust passage toward the oxidation catalyst and mixes exhaust gas which was stored in the tank and exhaust gas which flows out from the $NO_x$ storage reduction catalyst while feeding exhaust gas to the oxidation catalyst.

7. An exhaust purification system of an internal combustion engine as set forth in claim 6, wherein
the tank is formed so as to extend along the engine exhaust passage, and
the oxidation catalyst is arranged inside of the tank.

8. An exhaust purification system of an internal combustion engine as set forth in claim 6, wherein,
when an engine speed falls and thereby a flow rate of exhaust gas which flows into the $NO_x$ storage reduction catalyst is reduced, the flow path changing device is used to store lean air-fuel ratio exhaust gas in the tank, and,
after the flow rate of exhaust gas which flows into the $NO_x$ storage reduction catalyst is reduced, then becomes substantially constant, the system makes the air-fuel ratio of the exhaust gas which flows into the $NO_x$ storage reduction catalyst the stoichiometric air-fuel ratio or rich and opens the engine exhaust passage toward the oxidation catalyst.

* * * * *